Figure 1:
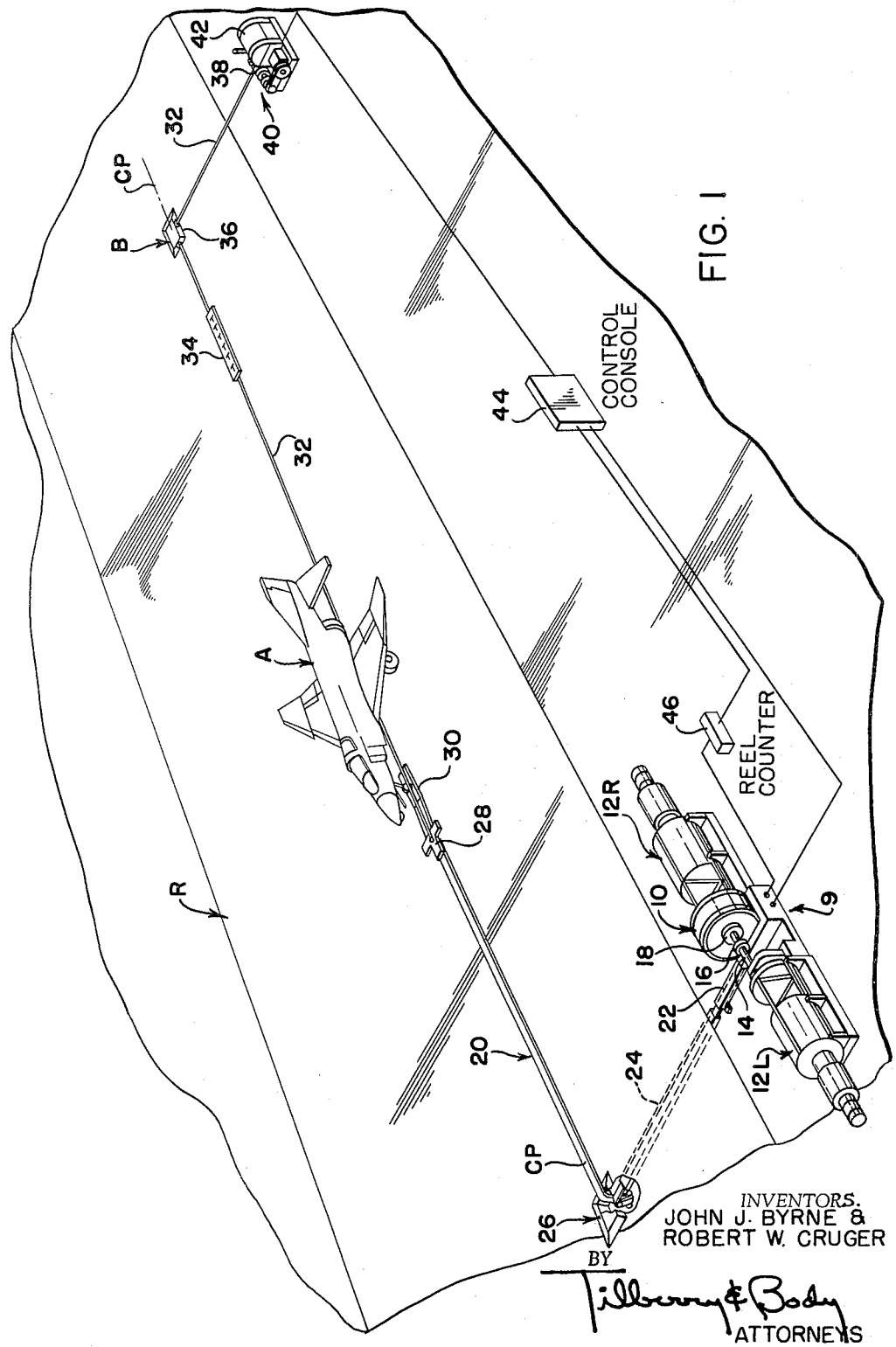

Jan. 11, 1966     J. J. BYRNE ETAL     3,228,630
AIRCRAFT LAUNCHING SYSTEM

Filed May 6, 1964     2 Sheets-Sheet 1

INVENTORS.
JOHN J. BYRNE &
ROBERT W. CRUGER
BY Tillberry & Body
ATTORNEYS

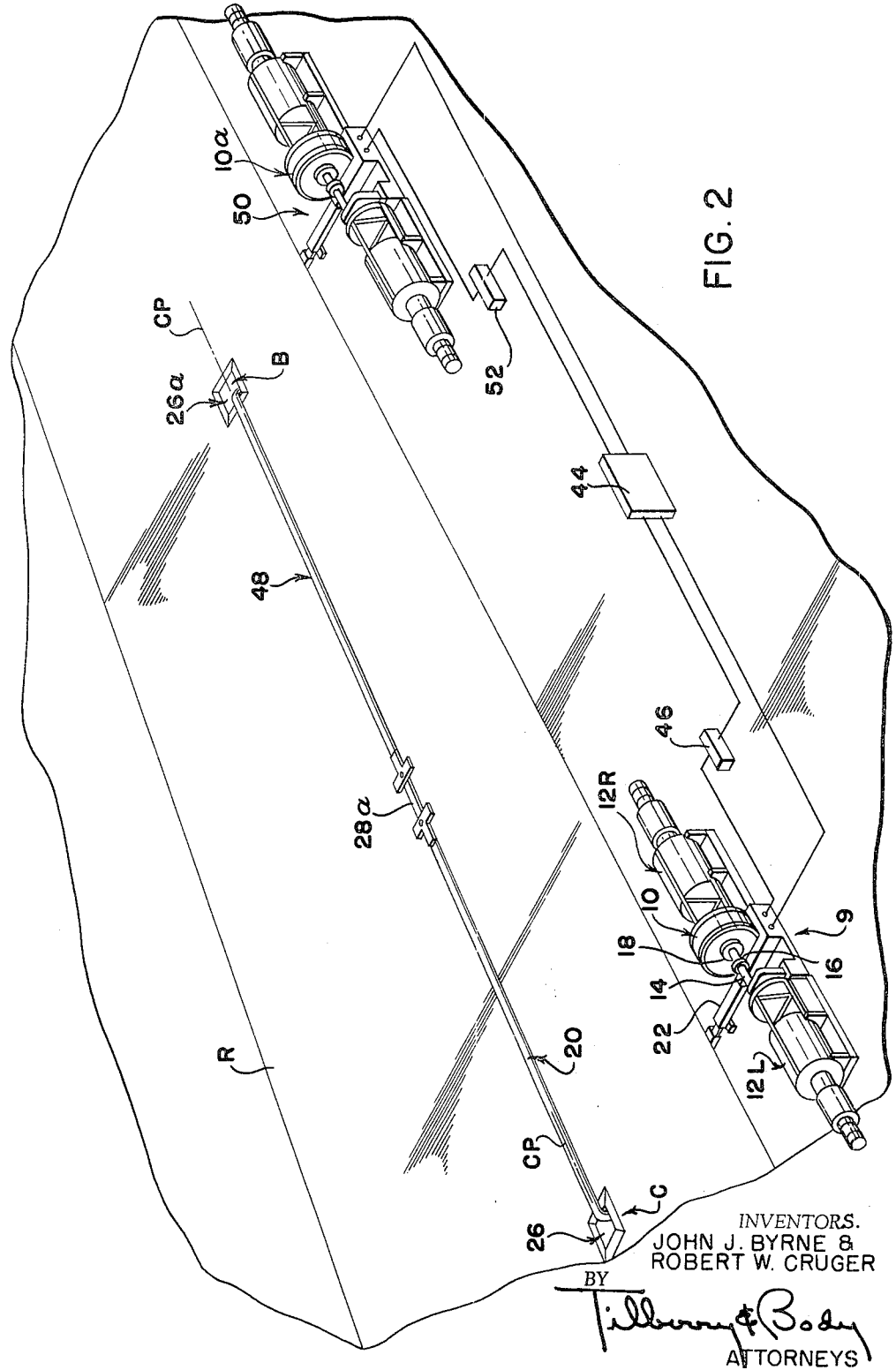

United States Patent Office 3,228,630
Patented Jan. 11, 1966

3,228,630
AIRCRAFT LAUNCHING SYSTEM
John J. Byrne, Canton, Ohio, and Robert W. Cruger, Springfield, Pa., assignors to E. W. Bliss Company, Canton, Ohio, a corporation of Delaware
Filed May 6, 1964, Ser. No. 365,368
8 Claims. (Cl. 244—63)

This invention pertains to the art of launching vehicles, such as aircraft and the like, along a predetermined path. This application is a continuation-in-part of our copending parent application, Serial No. 123,527, filed July 12, 1961, issued as United States Patent No. 3,142,458 on July 28, 1964, which was in turn a continuation-in-part of and copending with our application, Serial No. 778,723, filed December 8, 1958, now abandoned.

The invention is particularly adapted for launching aircraft along a predetermined catapult path and will be described with particular reference thereto, although it will be appreciated that the invention may also be used for vertical launch or accelerating operations, such as missile assisted take-off or rapid high capacity elevators.

A catapult system known heretofore for launching aircraft and the like utilizes a so called "sling shot" principal. Such known arrangement may include a cable loaded reel located on each side of an aircraft runway with the cable on each reel connected at one end to its reel and at its other end to a pendant, which extends transversely across the runway between the reels. For launching aircraft the midpoint of the pendant is placed down the runway at a battery position and an aircraft is suitably connected to the pendant. Drive means are provided for rotating each reel to reel in the cable and in so doing accelerate the midpoint of the pendant along a predetermined catapult path along the runway. The aircraft is likewise accelerated along the catapult path from the battery position until it reaches its required take-off velocity. Thereafter a suitable retract system is utilized for retracting the pendant down the runway to its battery position for purposes of launching a second aircraft.

Such a launching system as described above is frequently utilized also as an aircraft arresting device whereby the pendant serves to engage an aircraft as it lands on the runway. However, in certain airport facilities the need is not present for a combined aircraft launching and arresting system, and only a launching system is required.

The present invention is directed toward a novel launching system for launching aircraft or the like, along a predetermined catapult path and which is inherently a more simplified system than the "sling-shot" type launching system.

In accordance with the present invention there is provided an aircraft launching mechanism which includes a flat, wide band tape as compared to cables and the like incorporated in similar systems known heretofore. A reel is connected to one end of the tape and is constructed so that the tape is wound thereon in ever increasing, single stack, concentric layers. The other end of the tape is connected to a shuttle adapted to tow an aircraft or the like along a predetermined catapult path as the tape is wound on the reel by virtue of driving means drivingly connected to the reel.

In accordance with another aspect of the present invention, the shuttle is connected with shuttle arresting means by virtue of an interconnecting shuttle trailing connecting member for purposes of stopping motion of the shuttle at a predetermined point along the launch path.

In accordance with still another aspect of the present invention, the interconnecting shuttle trailing member takes the form of a second flat, wide band tape connected at one end to the shuttle and at the other end to a second reel constructed so that the second tape may be wound thereon in ever increasing, single stack, concentric layers. Driving means are drivingly connected to the second reel for purposes of obtaining a bi-directional aircraft launching system.

The primary object of the present invention is to provide an aircraft launching system for launching an aircraft along a predetermined catapult path and which is relatively simple in construction and economical to manufacture.

Another object of the present invention is to provide an aircraft launching system which utilizes flat, wide band tape means which may be wound on a launching reel in ever increasing, single stack, concentric layers.

A still further object of the present invention is to provide a single, flat wide band tape means longitudinally aligned for movement parallel to the center line of a runway.

These and other objects and advantages of the present invention will become apparent from the following description used to illustrate the preferred embodiments of the invention as read in connection with the accompanying drawings in which:

FIGURE 1 is a perspective view illustrating one embodiment of the present invention; and FIGURE 2 is a perspective view illustrating a second embodiment of the present invention.

Referring now to FIGURE 1, there is illustrated a typical installation of the present invention employed for launching an aircraft A from a runway R along a predetermined linear catapult path CP extending longitudinally of and parallel to the center line of the runway. Positioned to one side of runway R there is provided a launch mechanism 9 including a single tape reel 10, such as shown and described in our parent copending application, Serial No. 123,527, identified hereinabove. Reel 10 is drivingly connected at its left and right sides, as viewed in FIGURE 1, to substantially identical turboshaft jet engines 12L and 12R. Each of the jet engines is coupled to the reel 10 in identical manner; as for example, engine 12L is coupled to the left side of reel 10 by means of shafting 14 and clutch 16. Hydraulic brake means 18 are carried on each side of the reel for purposes of braking the reel when desired, as will be described in greater detail hereinafter.

A flat, wide band tape of woven synthetic material, such as nylon or orlon, is secured at one end to reel 10. Tape 20 extends from reel 10 through a tape protector conduit 22 leading from the reel 10 and thence through a second tape protector conduit 24 extending under the surface of runway R and transversely thereof from conduit 22 to one end of the catapult path CP. A tape turn around sheave assembly 26 is provided at the other end of conduit 24 an opens upwardly through the runway R for purposes of turning the tape 20 at an angle of approximately 90° and elevating the tape from below to above the surface of runway R with a minimum of frictional forces. Tape 20 after passing through the turn around assembly 26 extends along the predetermined catapult path CP and is secured at its other end to one end of a shuttle 28. Shuttle 28 serves to slide along catapult path CP under tow from tape 20 and in so doing tows aircraft A via a bridle 30 from battery position B along the path CP to a predetermined launch position, which is dependent on the type of aircraft being launched.

A wire rope trailing cable 32 is connected to the other end of shuttle 28 and extends along the catapult path CP through an aircraft hold-down plate 34 and thence to the battery position B. At the battery position B the cable 32 extends through a turn around sheave assembly 36 which serves to bend cable 32 substantially 90° with a minimum of frictional forces. The cable 32 then extends transversely of the runway R and is connected at its other end to a cable drum 38 of a shuttle arrest-retract system 40. The retract system 40 includes a rewind engine 42 drivingly connected to drum 38 for purposes of rewinding cable 32 on the drum 38 after a launch operation. The retract system 40 also includes a rotary friction brake, not shown, for purposes of applying braking force to the drum 38 for arresting motion of shuttle 28, as will be described in greater detail hereinafter.

A control console 44 may be electrically connected to the shuttle retract system 40 and to the turboshaft jet engines 12L and 12R and their associated clutch and brake components for automatically controlling launch and shuttle retract operations. A reel revolution counter 46 is also electrically connected between the control console 44 and the reel 10 for purposes of counting the revolutions of reel 10 as the tape 20 is being wound thereon during launch operations. At a predetermined count corresponding to a predetermined position of aircraft A along the catapult path CP at which the aircraft has reached a sufficient velocity for take-off, the counter is operative to develop a control signal. Control console 44 is responsive to the output control signal developed by the counter 46 to in turn develop a control signal which is then applied to the various components associated with jet engines 12L and 12R and reel 10, whereby the clutch 16 associated with each engine is disengaged and the brakes 18 on each side of the reel 10 are operated to stop further rotation of the reel 10. The control console 44 is also operative at this point to apply suitable control signals to the retract system 40 to apply the rotary friction brakes thereof to decelerate the shuttle 28 to which drum 38 is connected via cable 32.

Of particular importance in the present invention is the construction and coaction of reel 10 and tape 20, both of which are preferably constructed in accordance with that shown and described in our parent copending application, Serial No. 123,527, now United States Patent No. 3,142,458 identified hereinbefore. The tape 20 is of flat, wide band configuration wherein the width is great compared to the thickness of the tape sufficient to permit the tape to spirally wind and unwind upon itself concentrically layer upon layer. The reel 10 is constructed relative to the configuration of the tape 20 so that the tape coils radially by laminating one layer of tape concentrically upon another. In this manner, as the tape is being unwound from the reel (during shuttle retract operations), or being wound on the reel (during aircraft launching), there is no wedging action between adjacent turns of the tape, such as inherent in wire cable wound reels. Still further, the construction and coaction of the tape and reel prevents kinking, overlapping and binding actions prevalent in cable wound reel systems known heretofore.

Also, the tape 20 is constructed of woven high tensile strength synthetic fiber, such as nylon and orlon, which in addition to imparting sufficient strength to the tape to withstand high forces of tension to which the fibers are subjected, also lends itself to ease of handling and reliability in winding and unwinding the tape 20 on the reel 10.

By so constructing the reel 10 and tape 20, as described above, an important mechanical advantage is obtained. This advantage is an inherent capability of tape 20 and reel 10 to utilize the maximum horsepower of the jet engines 12L and 12R during the launching of aircraft. Thus, for example, with aircraft A positioned at battery position B and connected to the shuttle 28 via bridle 30, the tape 20 is paid out to its full length. The moment arm of reel 10 is at its maximum level substantially equal to th radius of the drum portion of the unloaded reel. It is highly important that initially the moment arm of the reel be small so that the jet engines 12L and 12R may rapidly accelerate to the r.p.m. at which they develop maximum horsepower. However, once the aircraft is in motion and is being brought up to speed, the torque requirements on the reel become propressively reduced at the same time that tape speed must progressively increase. This is automatically provided by tape 20, which winds upon itself and develops a moment arm of ever increasing radius, such that when the highest speed is required of the tape the torque has been reduced to its lowest level approximately at the time the aircraft has become airborne. The combination of the reel 10 and tape 20 therefore can be analogized to a velocity sensitive gear reduction system or a continuously variable transmission. This feature permits the jet engines 12L and 12R to be operated at their maximum horsepower since the corresponding r.p.m. of the reel 10 may be maintained relatively constant during the launch stroke while at the same time the velocity of the free end of tape 20 progressively increases.

In the operation of the present launching system the aircraft A, the shuttle 28 and tape 20 are retracted to the battery position B by means of retract system 40. At this point the tape 20 is essentially fully paid out and reel 10 is unloaded, exhibiting a minimum moment arm. The friction brakes on the drum 38 of retract system 40 are applied to lock the shuttle in position until the aircraft A is hooked to the shuttle 28 via bridle 30. Hold-back plate 34 serves as means to initially anchor the aircraft at the battery position to prevent it from moving forward prematurely. Thereafter the aircraft may be launched.

During the actual launching of the aircraft the pilot accelerates the aircraft's engine. The turboshaft jet engines 12L and 12R are operated to transmit torque to reel 10 via their respectively associated clutches 14 and shafts 16 to wind the tape 20 on the reel 10. As the reel 10 rotates, the tape 20, shuttle 28 and aircraft A are accelerated along the catapult path CP due to the acceleration of engines 12L and 12R, as well as due to the variable transmission effect of the reel and tape coaction, described hereinabove. At a predetermined point along the catapult path CP corresponding to the appropriate take-off point of aircraft A, the reel rotation counter 46 will be operative to develop an output signal and apply the signal to the control console 44. The control console 44 will in turn develope output signals to disengage clutches 16 associated with engines 12L and 12R and apply the brakes 18 on the left and right side of reel 10. At the same time control console 44 also applies a control signal to the retract mechanism 40 to apply the rotary friction brakes therein for purposes of stopping further rotation of drum 38. In this manner motion of shuttle 28 is arrested, decelerating the shuttle while at the same time the aircraft will become detached from the shuttle and become airborne. Upon complete deceleration of the shuttle 28 the brakes in the launch mechanism 9 and in the retract mechanism 40 are disengaged and the retract means 40 is operated to retract the shuttle 28 to the battery position B in preparation for launching a second aircraft.

Reference is now made to FIGURE 2 illustrating a second embodiment of the invention wherein like character references are used to indicate like components illustrated in FIGURE 1. The embodiment illustrated in FIGURE 2 is identical to that as shown in FIGURE 1 except that the retract mechanism 40 and the trailing cable 32 and their associated components have been respectively replaced by a second wide band tape 48 and a second launch mechanism 50. The tape 48 is identical to tape 20 and the launch mechanism 50 is identical to the launch mechanism 9. A second reel counter 52 is connected between reel 10a of launch mechanism 50 and control console 44 for purposes of counting revolutions of the reel 10a in the same manner as reel counter 46 serves to count the revolutions of reel 10. The shuttle 28a in FIGURE 2 is substantially that of shuttle 28 in FIGURE 1, but has been modified somewhat for use in bi-directional launching operations. Also, the cable turn around sheave 36 in FIGURE 1 has been replaced in the embodiment illustrated in FIGURE 2 with a turn around sheave 26a which is identical to turn around sheave 26 for purposes of use with the tape 48. Otherwise the embodiment of the invention in FIGURE 2 is identical with that of the embodiment illustrated in FIGURE 1 except that the former pertains to bi-directional aircraft launching.

The operation of the embodiment illustrated in FIGURE 2 is exactly that as illustrated in FIGURE 1 with slight exceptions and accordingly only the exceptions need be further described. When an aircraft is to be launched from right to left, as viewed in FIGURE 2, the tape 48 is reeled onto reel 10a until the shuttle 28a is in its battery position B, and then the aircraft is hooked to the shuttle in the manner as described with respect to the embodiment illustrated in FIGURE 1. Thereafter during the launch of the aircraft the reel counter 46 will at a predetermined point along the launch path CP corresponding to the launch position of the aircraft will develop an output signal which is applied to the control console 44. The control console 44 will in turn develop control signals for simultaneously de-energizing the clutches associated with launch mechanism 9 and launch mechanism 50, and then apply the brakes associated with the launch mechanisms to thereby decelerate the shuttle 28a at which time the aircraft becomes airborne. The shuttle 28a may thereafter be further towed to the left end portion of the catapult path CP to a second battery position C, at which another aircraft may be connected to the shuttle and thereafter launched from left to right, as viewed in FIGURE 2, along the launch path CP in the manner as described hereinbefore. If desired, launching can be accomplished in only one direction, i.e., from right to left as viewed in FIGURE 2, by retracting the shuttle 28a to battery position B after each launch by reversing the direction of rotation of reel 10a to rewind tape 48.

The present invention has been described in connection with two particular structural embodiments which have proven satisfactory; however, it is appreciated that the structural embodiments may be modified without departing from the intended spirit and scope of the invention, as defined by the appended claims.

What is claimed is:

1. An aircraft launching mechanism for launching an aircraft from a stationary position comprising a single elongated flat wide band tape means of woven synthetic material, reel means connected to one end of said tape means for winding said tape means in ever increasing single stack concentric layers, shuttle means connected to the other end of said tape means adapted to tow an aircraft from a stationary position to a launching position along a predetermined catapult path as said tape means is wound on said reel means, and driving means connected to said reel means for winding said tape means on said reel means.

2. An aircraft launching mechanism for launching an aircraft from a stationary position along and from a predetermined linear catapult path and comprising an elongated flat wide band tape means of woven synthetic material having at least a portion thereof in parallel relationship with said path, reel means connected to one end of said tape means for winding said tape means thereon in ever increasing single stack concentric layers, shuttle means connected to the other end of said tape means and located in said catapult path and adapted to tow an aircraft along said path from an aircraft stationary position to an aircraft launch position as said tape means is wound on said reel, and driving means drivingly connected to said reel means for winding said tape means on said reel means.

3. An aircraft launching mechanism as claimed in claim 2, including shuttle retract means and interconnecting means connecting said shuttle means with said shuttle retract means, whereby said shuttle means may be retracted to said stationary position.

4. An aircraft launching mechanism as claimed in claim 2, including shuttle arresting means and interconnecting means connecting said arresting means with said shuttle means for arresting motion of said shuttle means.

5. An aircraft launching mechanism as claimed in claim 2, wherein said tape means is wide and flat relative to its thickness, said tape means being spirally wound upon itself to unwind from said reel means in ever diminishing spirals, whereby the coaction between said reel means and tape means provides a continuously variable transmission.

6. An aircraft launching mechanism as claimed in claim 2, wherein said tape means is sufficiently wide relative to its thickness to permit said tape means to be spirally wound upon itself to unwind from said reel means from ever diminishing spirals, whereby the moment arm of said tape means measured from its outer periphery to the axis of said reel means decreases as the tape means unwinds.

7. An aircraft launching mechanism as claim in claim 2, wherein said tape means and said reel means define a continuously variable transmission.

8. An aircraft launching mechanism as claimed in claim 3, wherein said retract means includes second reel means and second driving means drivingly connected to said second reel means, and said interconnecting means is a second flat wide band tape means having at least a portion thereof in parallel relationship with said path, said second tape means being connected at one end to said shuttle means and at the other end to said second reel means for being wound thereon in ever increasing single stack concentric layers, whereby said first and second driving means may be utilized for bi-directional launch operations.

References Cited by the Examiner

UNITED STATES PATENTS

| 2,390,677 | 12/1945 | Alkan et al. | 244—63 |
| 2,872,132 | 2/1959 | Doolittle | 244—63 |
| 2,926,872 | 3/1960 | Fulton et al. | 244—63 |

MILTON BUCHLER, *Primary Examiner.*